US008957120B2

(12) United States Patent
Berthevas et al.

(10) Patent No.: US 8,957,120 B2
(45) Date of Patent: Feb. 17, 2015

(54) COMPOSITE PANEL WITH SOLID POLYURETHANE BINDER, AND PROCESS FOR MANUFACTURE

(75) Inventors: Paul R. Berthevas, Prevessin-Moens (FR); Michael Schoeler, Rheurdt (DE); Michael Grossenbacher, Zug (CH); Dean Budney, Lincoln, CA (US); Robert D. Villwock, Grass Valley, CA (US)

(73) Assignee: Mobius Technologies, Inc., Lincoln, CA (US)

(*) Notice: Subject to any disclaimer, the term of this patent is extended or adjusted under 35 U.S.C. 154(b) by 110 days.

(21) Appl. No.: 12/017,925

(22) Filed: Jan. 22, 2008

(65) Prior Publication Data

US 2008/0207783 A1 Aug. 28, 2008

Related U.S. Application Data

(60) Provisional application No. 60/881,971, filed on Jan. 22, 2007.

(51) Int. Cl.
*C08J 9/35* (2006.01)

(52) U.S. Cl.
USPC ............... 521/54; 521/99; 521/134; 521/137; 521/170; 428/304.4

(58) Field of Classification Search
USPC ............ 521/54, 99, 134, 137, 170; 428/304.4
See application file for complete search history.

(56) References Cited

U.S. PATENT DOCUMENTS

| | | | | |
|---|---|---|---|---|
| 3,164,511 | A | 1/1965 | Elmendorf | |
| 3,193,440 | A | 7/1965 | Schafer | |
| 3,549,472 | A | 12/1970 | King et al. | |
| 4,098,770 | A | 7/1978 | Berchem et al. | |
| 4,364,984 | A | 12/1982 | Wentworth | |
| 4,376,745 | A * | 3/1983 | Johns | 264/109 |
| 4,451,583 | A * | 5/1984 | Chesler | 521/49.5 |
| 4,839,393 | A | 6/1989 | Buchanan et al. | |
| 5,525,394 | A | 6/1996 | Clarke et al. | |
| 5,736,218 | A | 4/1998 | Iwata et al. | |
| 6,136,870 | A * | 10/2000 | Triolo et al. | 521/54 |
| 6,670,404 | B2 * | 12/2003 | Martel et al. | 521/40 |
| 2005/0019548 | A1 * | 1/2005 | Liu et al. | 428/313.5 |
| 2006/0035990 | A1 * | 2/2006 | Hennington et al. | 521/99 |
| 2008/0160303 | A1 * | 7/2008 | Evers et al. | 428/375 |

FOREIGN PATENT DOCUMENTS

| | | |
|---|---|---|
| DE | 3840167 | 5/1990 |
| EP | 0082295 | 6/1983 |
| EP | 0462474 | 12/1991 |
| FR | 1494918 | 12/1967 |
| JP | 2005119038 | 5/2005 |
| JP | 2005119038 A | 5/2005 |
| WO | 89/03291 | 4/1989 |
| WO | 2008/091892 A1 | 7/2008 |

OTHER PUBLICATIONS

International Preliminary Report on Patentability for PCT International Patent Application No. PCT/US2008/051704, mailed on Jul. 28, 2009.
International Search Report and Written Opinion for PCT International Patent Application No. PCT/US2008/051704, mailed on Jun. 23, 2008.
Knop et al., Phenolic Resins: Chemisty, Applications, standardization, Safety and Ecology, 2nd Completely Revised Edition, Mar. 17, 1995, Springer.
Pizzi, Advanced Wood Adhesives Technology, Aug. 1994, CRC Press.
Chinese Office Action (English translation) for Chinese Patent Application for Invention No. 200880008445 (PCT/US2008-051704), issued by the State Intellectual Property Office (SIPO) on Jun. 28, 2011.
Russian Office Action (English translation) for Russian Patent Application No. 2009131740/5(044481), issued by the Patent Office of the Russian Federation on Sep. 30, 2011.
Chinese Office Action (English translation) for Chinese Patent Application for Invention No. 200880008445.7 (PCT/US2008/051704), issued by the State Intellectual Property Office (SIPO) on Apr. 19, 2012.
Chinese Office Action (English translation) for Chinese Patent Application for Invention No. 200880008445.7 (PCT/US2008/051704), issued by the State Intellectual Property Office (SIPO) on Dec. 4, 2012.
Office Action issued on Jul. 8, 2014 in European Application No. 08728079.8.

* cited by examiner

*Primary Examiner* — John Cooney
(74) *Attorney, Agent, or Firm* — Pillsbury Winthrop Shaw Pittman LLP

(57) ABSTRACT

The embodiments of the invention are directed to a composite material comprising a fiber reinforcing material, a binder resin and polyurethane foam particles. Other embodiments are related to a process for manufacturing a composite material comprising a fiber reinforcing material, a binder resin and polyurethane foam particles, the method comprising depositing the binder resin and polyurethane foam particles the fiber reinforcing material to form a composite precursor and treating the composite precursor to form the composite material.

19 Claims, 4 Drawing Sheets

COMPOSITE PANEL WITH SOLID POLYURETHANE BINDER, AND PROCESS FOR MANUFACTURE

RELATED APPLICATIONS

This application claims benefit from U.S. Provisional Application Ser. No. 60/881,971. This application is related to U.S. Ser. No. 09/748,307, now U.S. Pat. No. 6,670,404, issued on Dec. 30, 2003, entitled "Polymeric foam powder processing techniques, foam powders products, and foams produced containing those foam powders," which is incorporated herein by reference.

FIELD OF INVENTION

Embodiments of the invention relate to the field of composite panels, particularly to the composition and manufacture of wood boards or panels such as oriented strand boards (OSB), which comprise particles of polyurethane.

BACKGROUND

Wood panels, and more particularly oriented strand boards (OSB), are ubiquitous in the building industry. In recent years, the market for OSB panels has significantly increased with the displacement of plywood panels in construction markets due to the fact that the structural performance of OSB can match that of plywood, at a lower cost.

There exists a need for processes and materials to improve physical properties such as toughness and impact resistance of OSB.

There exists a need to reduce the use of binders such as pMDI or PPF during the OSB manufacturing process, thereby reducing manufacturing cost and reducing the potential for worker exposure to hazardous chemicals.

Further, it is desirable to recycle waste PUR foam from industrial scrap and post-consumer sources.

SUMMARY OF THE INVENTION

An embodiment of the invention relates to a composite material comprising wood fiber and polyurethane, wherein at least a portion of the polyurethane may be derived from ground polyurethane foam. Another embodiment of the invention relates to a process to manufacture said composite material.

An embodiment of the invention relates to a composite material comprising a solid reinforcing material and a matrix, wherein the matrix comprises a binder resin and solid polyurethane particles, wherein the binder resin is a solid binder or a liquid binder, and wherein at least 50 weight percent of the composite material is the solid reinforcing material. Preferably, the weight percent of the solid polyurethane particles in the matrix is 5 to 95 weight percent of the matrix. More preferably, the weight percent of the solid polyurethane particles in the matrix is 30 to 60 weight percent of the matrix. Preferably, the solid reinforcing material comprises wood. Preferably, the wood is in a form selected from the group consisting of sheets, plies, wafers, strands, chips, particles, dust and combinations thereof. Preferably, the solid reinforcing material further comprises fibers. Preferably, the fibers are selected from the group consisting of carbon fibers, glass fibers, aramid fibers, cellulose fibers and combinations thereof. Preferably, the matrix is in a form of a continuous phase or a discontinuous phase. Preferably, the binder is selected from the group consisting of polymeric MDI, phenol formaldehyde, urea formaldehyde, melamine formaldehyde and combinations thereof. Preferably, the solid reinforcing material is oriented in a plane of the composite material. Preferably, the composite material is oriented strand board, and wherein the matrix in the surface layers comprises particles of ground rigid polyurethane foam.

Another embodiment of the invention relates to a process for manufacturing a composite material comprising a solid reinforcing material and a matrix, wherein the matrix comprises a binder resin and solid polyurethane foam particles, wherein the binder resin is a solid binder or a liquid binder, and wherein at least 50 weight percent of the composite material is the solid reinforcing material, the method comprising depositing the binder resin and polyurethane foam particles on the solid reinforcing material to form a composite precursor and treating the composite precursor to form the composite material. Preferably, the depositing the binder resin and polyurethane foam particles on the solid reinforcing material is by spraying a mixture of the binder resin and polyurethane foam particles on the solid reinforcing material. Preferably, the depositing the binder resin and polyurethane foam particles on the solid reinforcing material is by spreading the polyurethane particles on the solid reinforcing material and subsequently spraying the binder resin on the solid reinforcing material. Preferably, the treating the composite precursor to form the composite material comprises treating the composite precursor under heat and pressure. Preferably, the treating the composite precursor under heat and pressure is performed in a mold or an autoclave. Preferably, the solid reinforcing material comprises wood. Preferably, the wood is in a form selected from the group consisting of sheets, plies, wafers, strands, chips, particles, dust and combinations thereof. Preferably, the solid reinforcing material further comprises fibers. Preferably, the fibers are selected from the group consisting of carbon fibers, glass fibers, aramid fibers, cellulose fibers and combinations thereof. Preferably, the binder is selected from the group consisting of polymeric MDI, phenol formaldehyde, urea formaldehyde, melamine formaldehyde and combinations thereof.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Figure 1:
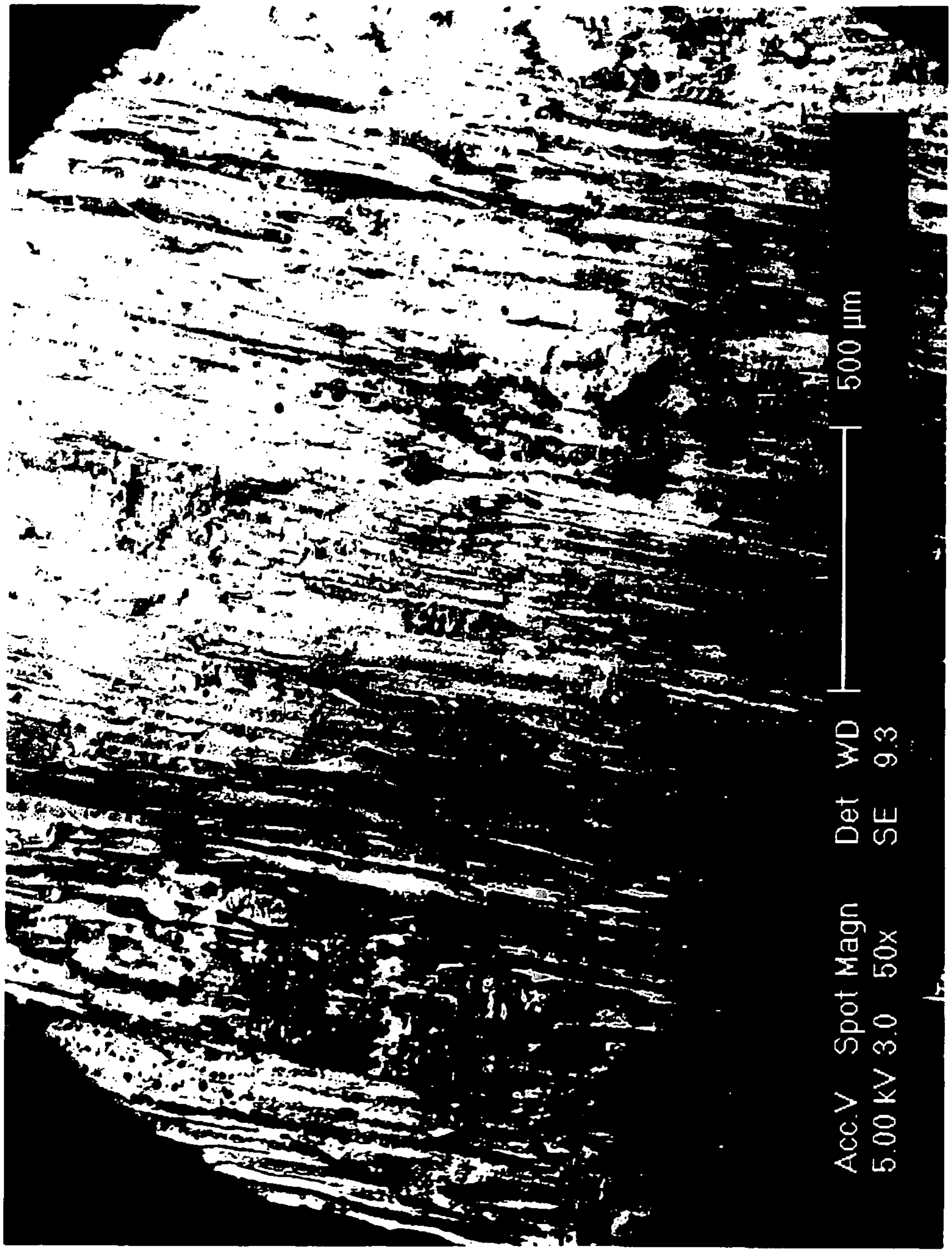
FIG. 1 shows a wide microscopic view of a fracture surface of a prior-art OSB sample as a comparative example. This OSB sample does not contain any ground polyurethane foam.

Oriented strand board (OSB) is a wood-based construction panel product comprised of wood strands that are sliced from logs, dried, mixed with relatively small quantities of wax and adhesive resin, typically about 5% by total weight, formed in mats with orientation of the wood strands controlled in the length and width directions. The mats are then pressed under heat and pressure, and thermosetting polymeric bonds are created, binding together the adhesive and wood strands to achieve rigid, structural grade panels.

A manufacturing process for OSB is disclosed at length in U.S. Pat. No. 3,164,511, issued Jan. 5, 1965, to Elmendorf. The advantages of OSB include that it has properties similar to natural wood, but can be manufactured in panels of various thicknesses and sizes, which may be as long as 15 meters.

In the present OSB manufacturing process, flakes are created from debarked round logs by placing the edge of a cutting knife parallel to a length of the log and the slicing thin flakes from the log. The thickness of a flake is about 0.2 to 0.8 mm. Cut flakes are subjected to forces that break the flakes into strands having a length parallel to the grain of the wood several times the width of the strand. The strands can be oriented on the board forming machine with the strands predominantly oriented in a single direction (for example, the cross-machine direction) in one layer (for example, a core layer) and predominantly oriented in the generally perpendicular (machine) direction in adjacent layers. The various core and face layers are bonded together by adhesive resin under heat and pressure to make the finished OSB product. Common adhesive resins include urea-formaldehyde (UF), phenol-formaldehyde (PP), melanine-formaldehyde (MF), and polymeric methylene diphenyl diisocyanate (pMDI).

The common grade of OSB is used for sheathing walls and decking roofs and floors where strength, light weight, ease of nailing, and dimensional stability under varying moisture conditions are important attributes.

The properties or appearance of OSB have been improved more recently, for example in U.S. Pat. No. 4,364,984, U.S. Pat. No. 5,525,394, U.S. Pat. No. 5,736,218, by changes in the manufacturing processes, changing the shape of fiber pieces, arrangement, structure and adhesives. However, OSB having improved toughness or impact resistance has not been developed, nor has OSB containing polyurethane powders replacing at least some of the binder been developed, nor has OSB containing recycled ground polyurethane foam replacing at least some of the binder been developed.

"Polyurethane" (PUR) describes a general class of polymers prepared by polyaddition polymerization of diisocyanate molecules and one or more active-hydrogen compounds. "Active-hydrogen compounds" include polyfunctional hydroxyl-containing (or "polyhydroxyl") compounds such as diols, polyester polyols, and polyether polyols. Active-hydrogen compounds also include polyfunctional amino-group-containing compounds such as polyamines and diamines. An example of a polyether polyol is a glycerin-initiated polymer of ethylene oxide or propylene oxide. Cellulose, a primary constituent of wood, is another example of polyfunctional hydroxyl-containing compound.

"PUR foams" are formed (in the presence of gas bubbles, often formed in situ) via a reaction between one or more active-hydrogen compounds and a polyfunctional isocyanate component, resulting in urethane linkages. PUR foams are widely used in a variety of products and applications. Closely related to PUR foams are polyisocyanurate (PIR) foams, which are made with diisocyanate trimer, or isocyanurate monomer, and are typically rigid foams. PUR foams that are made using water as a blowing agent also contain significant amounts of urea functionality, and the number of urea groups may actually exceed the number of urethane groups in the molecular structure of the foamed material, particularly for low-density foams.

PUR foams may be formed in wide range of densities and may be of flexible, semi-rigid, or rigid foam structures. All are thermoset polymers, with varying degrees of crosslinking. Generally speaking, "flexible foams" are those that recover their shape after deformation, and are further classified as "conventional" or "high-resilience" foams depending upon their resilience. In addition to being reversibly deformable, flexible foams tend to have limited resistance to applied load and tend to have mostly open cells. About 90% of flexible PUR foams today are made with an 80:20 blend of the 2,4- and 2,6-isomers of toluene diisocyanate (TDI). "Rigid foams" are those that generally retain the deformed shape without significant recovery after deformation. Rigid foams tend to have mostly closed cells. Compared to lightly-crosslinked flexible PUR foams, rigid PUR foams are highly crosslinked. Rigid PUR foams are generally not made with an 80:20 blend of the 2,4- and 2,6-isomers of toluene diisocyanate, but rather with other isocyanates. However, many rigid PUR foams for refrigerator insulation are made with crude TDI. "Semi-rigid" foams are those that can be deformed, but may recover their original shape slowly, perhaps incompletely. Semi-rigid foams are commonly used for thermoformable polyurethane foam substrates in automotive headliner manufacture. Flexible, viscoelastic polyurethane foam (also known as "dead" foam, "slow recovery" foam, "viscoelastic" foam, "memory" foam, or "high damping" foam) is characterized by slow, gradual recovery from compression. While most of the physical properties of viscoelastic foams resemble those of conventional foams, the resilience of viscoelastic foams is much lower, generally less than about 15%. Suitable applications for viscoelastic foam take advantage of its shape-conforming, energy-attenuating, and sound-damping characteristics. Most flexible, viscoelastic polyurethane foam is produced at low isocyanate index (100 times the mole ratio of —NCO groups to NCO-reactive groups in the formulation). Usually, the index is less than about 90.

PUR foams are produced using small amounts of organotin catalysts, and these generally remain in the material, for example in flexible slabstock PUR foam at a concentration of about 500 to 5000 ppm. PUR foams are also produced generally using small amounts of siloxane-polymer-based silicone surfactants, and these generally remain in the material, for example in flexible slabstock PUR foam at a concentration of about 0.3 to 1.3 percent.

Surprisingly, the inventors have found that it is possible to use polyurethane powders as binders in manufactured wood products, for example OSB, wood particle board, plywood, laminates, medium-density fiberboard (MDF), and hardboard. Polyurethane powders may be obtained from various recycling sources such as ground foam from industrial scrap or post-consumer sources such as insulated panels, packaging foam material, refrigerator recycling, furniture, mattresses, automobile or carpet cushion recycling; or polyurethane powders could be made specifically for use as binders. An excellent source of polyurethane powder for the purposes of this invention is from grinding polyurethane foam, such as rigid PUR foam, or flexible PUR foam from slabstock or molded foam manufacturing scrap, or rigid PUR manufacturing scrap, or semi-rigid PUR from automotive headliner manufacturing scrap, or viscoelastic PUR foam, or even rigid PUR foam from insulated panel recycling, refrigerator recycling, or PUR insulated roofing recycling.

In an embodiment of the invention, oriented strand board comprises polyurethane powder as a binder. Preferably, the oriented strand board further comprises a co-binder such as pMDI, liquid or powdered PF, UF, or MF. Preferably, the polyurethane powder comprises ground polyurethane foam.

In another embodiment of the invention, a process for manufacturing oriented strand board comprises wood strands and a matrix, wherein the matrix comprises a binder resin and solid polyurethane particles, and wherein at least 50 weight percent of the composite material is wood strands, the method comprising depositing the binder resin and solid polyurethane particles on the wood strands to form a composite precursor and treating the composite precursor to form the composite material.

Typically in OSB manufacturing processes, other additives are used, commonly water (to maintain the optimum moisture content for heat transfer and heat generation via reaction of water with isocyanate) and a water-repellent agent (for example, wax or paraffin emulsion). Although the invention may be practiced satisfactorily without regard to the order of addition of the various components, the inventors have found in some cases a preferred order of addition for some formulations is: water, wax, polyurethane particles, and then binder. Particularly in formulations where the amount of added water is high (6 to 12%), this preferred order of addition is advantageous because it avoids agglomeration of the polyurethane particles, thereby providing a better distribution of polyurethane particles and improved properties.

In another preferred embodiment of the process, polyurethane powder is added before a liquid binder such as pMDI. This provides a better distribution of the liquid binder to the surfaces of the wood, due to the fact that some of the binder is on the surface of polyurethane particles, which deform and release that binder during subsequent processing. Also, the polyurethane powder performs as an extender because the distribution of binder onto the polyurethane particles inhibits the liquid binder from soaking into wood strands, and thereby keeps more binder accessible for adhesion at the surfaces of wood strands during pressing.

EXAMPLES

Example 1

Comparative Example

Strands of pine (*pinus sylvestris*) were made according to standard industry methods, dried from an preconditioned moisture content of about 9% to a final moisture content of 1.3 to 1.7% at 100 to 120° C., then screened into three fractions (coarse, medium, and fine), and stored in sealed containers. The same batch of strands was used for examples 1, 2, and 3. The mixture of strands used for manufacturing boards was 15% fine, 48% medium, and 37% coarse, where the size distribution of the strand fractions were characterized as shown in Table 1.

TABLE 1

Size distribution of pine strands

| | | unit | coarse | medium | fine |
|---|---|---|---|---|---|
| Length | Mean | (mm) | 112.0 | 75.0 | 39 |
| | Standard deviation | (mm) | 29.0 | 30.0 | 18 |
| Width | Mean | (mm) | 11.7 | 8.1 | 5 |
| | Standard deviation | (mm) | 7.6 | 6.0 | 3.3 |
| Thickness | Mean | (mm) | 0.8 | 0.8 | 0.69 |
| | Standard deviation | (mm) | 0.3 | 0.3 | 0.28 |

The strands were resinated in a rotating drum according to the following procedure. First, the strands were placed in a blender drum, which was then closed and allowed to rotate for 5 minutes. Liquid pMDI (Huntsman Suprasec 5005, with approximately 30% NCO content) was then sprayed in with an atomizer having a diameter of 135 mm and a speed of 12,000 rpm. After the pMDI was sprayed, a mixture of water and wax (Sasol Hydrowax 750, for water repellency in the final product) was sprayed on. Finally, the drum was rotated an additional 5 minutes. The amounts of pMDI, water, and wax vary for the core layer composition and the surface layer composition as shown in Table 2.

TABLE 2

Production parameters

| | | unit | |
|---|---|---|---|
| | Board dimensions | mm | 500 × 500 × 11.1 |
| | Target density | kg/m$^3$ | 613 |
| | Hot platen temperature | ° C. | 210 |
| | Pressing time | s | 170 |
| | Weight ratio, core/surface | — | 44/56 |
| | Wax addition | % | 2 |
| | Moisture of strands before resination | % | 1.3 to 1.7 |
| Core layer | Moisture of strands after resination | % | 6 |
| | Total resin content | % | 2 |
| Surface layer | Moisture of strands after resination | % | 12 |
| | Total resin content | % | 3.1 |

The resinated strands were then manually spread out into a mat with substantially all of the strands flat, but with their long dimensions randomly oriented within each layer in a 500×500 mm box. The mat was laid up as half of a known weight of surface layer composition, then a known weight of core layer composition, then the remaining half of a known weight of surface layer composition. A thermocouple was added in the center of the core layer in order to monitor temperature there during subsequent pressing.

The mat was then transferred to a heated distance-controlled Siempelkamp press, with platens at 210° C., where it was compressed in two stages: first, to a thickness of 12.2 mm, then, after the core temperature measured 100° C., to a specific pressure of 1.4 to 1.7 N/mm$^2$ until the final desired thickness of 11.1 mm was reached. The press was held at the final thickness for the remainder of the 170-second pressing time before opening the press and removing the board. The density profile of each board was such that the ratio of the minimum local density divided by the average density of the board is in the range of 90 to 95%.

Before testing, boards were conditioned for a minimum of 18 hours. Three separate boards were manufactured and tested for each example, and five samples were cut from each board for each physical test, for a total of 15 test samples for each example. Physical properties of the boards were determined using standard methods described herein, and the results are shown below in Table 3.

Figure 2:
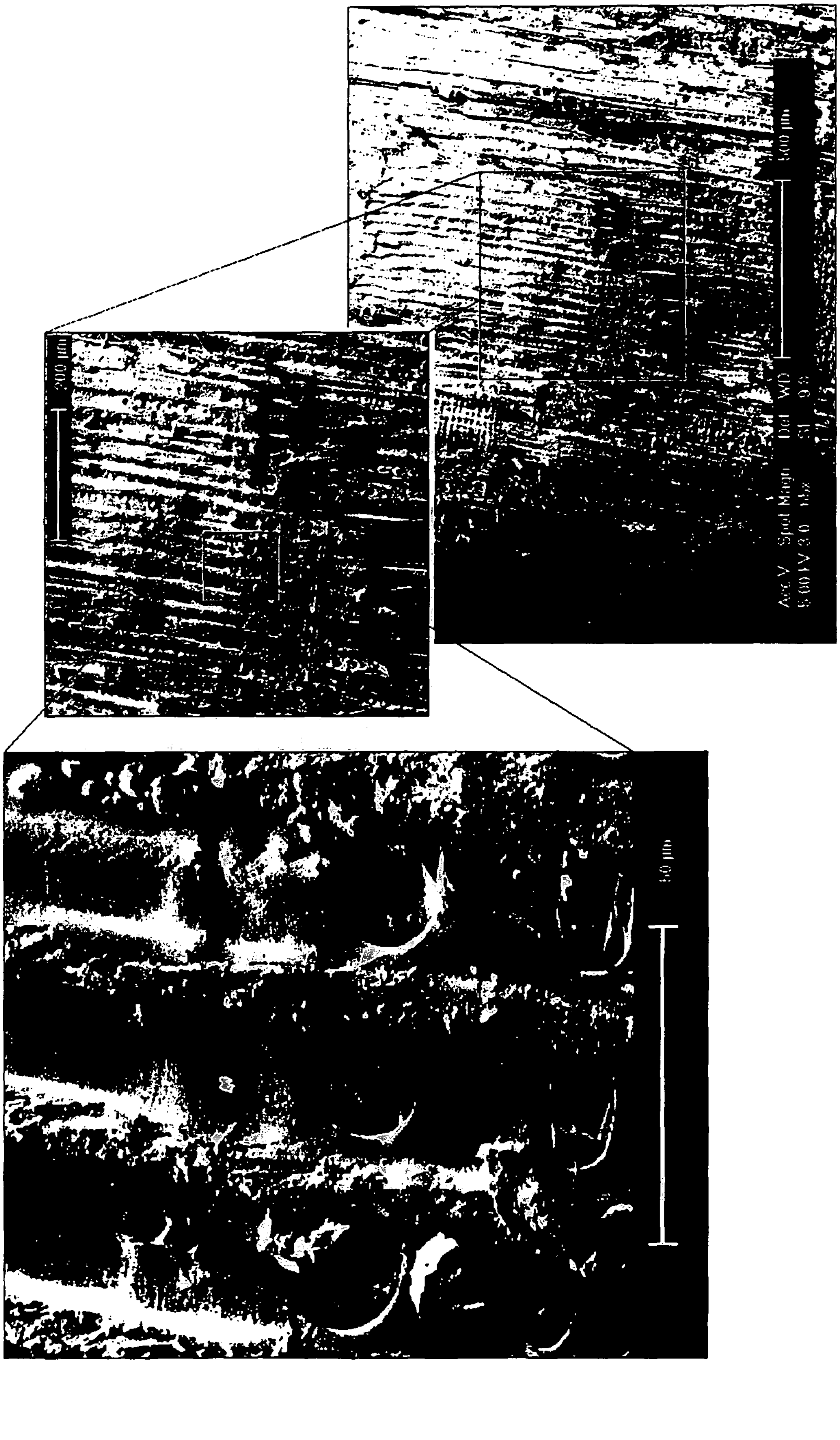
FIG. 2 shows a microscopic view at three magnifications of a different part of the same OSB sample as FIG. 1. Here, a high-magnification view reveals particles that are not ground polyurethane foam.

A sample board was examined using scanning electron microscopy by first creating a delamination between a surface layer and the core layer of the finished board using a chisel, then peeling away to expose a fresh fracture surface. The surface was plasma-coated with a thin layer of gold to reduce charging in the electron beam before placing in the scanning electron microscope (SEM). FIG. 1 shows a wide microscopic view of a fracture surface of this prior-art OSB sample as a comparative example. This OSB sample does not contain any ground polyurethane foam. FIG. 2 shows a closer microscopic view at three magnifications of a different part of the same sample. In FIG. 2, a high-magnification view reveals particles that are not ground polyurethane foam. These are likely dust, wood fines, or contamination. In both FIGS. 1 and 2, the cellular structure of the wood is visible, with the wood grain running primarily vertically.

Example 2

Boards were made exactly as in Example 1, except that during resination, 40 percent of the pMDI was not used, and instead was replaced by the same mass of ground polyurethane foam. The ground polyurethane foam was added prior to the pMDI by spreading it over the wood strands after they had been placed in the drum and before the drum was rotated for 5 minutes. The ground polyurethane foam for this example was rigid PUR foam obtained from recycled refrigerators, where the foam had been separated from the other materials and finely ground, fully destroying the cellular structure, with recovery of chlorofluorocarbon blowing agents. A particle-size distribution of this ground polyurethane foam was determined using a Hosokawa Micron Air-Jet Sieve to be 14% passing 53 microns, 48% passing 75 microns, 87% passing 105 microns, 99% passing 150 microns, and essentially 100% passing 212 microns. This particle-size distribution, like others in subsequent examples herein, is not intended to be limiting on the invention, as inventors have demonstrated similar and satisfactory results using similar polyurethane powders with maximum particle sizes as small as 45 microns and as large as 1.2 mm.

The resulting boards were tested as in Example 1. The results of physical-property testing of the boards are shown in Table 3.

TABLE 3

Composition and physical properties from Examples 1 and 2

| | | unit | Example 1 (prior art) | Example 2 |
|---|---|---|---|---|
| Surface layer | Moisture content | % | 12 | 12 |
| | Wax content | % | 2 | 2 |
| | Ground PUR foam substitution | % of resin | 0 | 40 |
| | Ground PUR foam content | % | 0 | 1.24 |
| | pMDI content | % | 3.1 | 1.86 |
| | Total resin content (pMDI + PUR) | % | 3.1 | 3.1 |
| Core layer | Moisture content | % | 6 | 6 |
| | Wax content | % | 2 | 2 |
| | Ground PUR foam substitution | % of resin | 0 | 0 |
| | Ground PUR foam content | % | 0 | 0 |
| | pMDI content | % | 2 | 2 |
| | Total resin content (pMDI + PUR) | % | 2 | 2 |

TABLE 3-continued

Composition and physical properties from Examples 1 and 2

| | unit | Example 1 (prior art) | Example 2 |
|---|---|---|---|
| Density | kg/m$^3$ | 613 | 613 |
| Internal bond strength | MPa | 0.69 | 0.69 |
| Modulus of rupture | MPa | 26 | 23 |
| Modulus of elasticity | MPa | 3900 | 3400 |

Both examples produced boards with identical internal bond strength. Modulus of rupture and modulus of elasticity appear to be slightly reduced, as shown in Table 3, however the differences are not statistically significant, and as such the physical properties are practically identical.

The presence of ground polyurethane foam in OSB could be identified in a number of ways. Spectroscopic identification of polyurethane or polyurea is difficult in OSB made with pMDI adhesive, but is possible for OSB made with other adhesive systems (for example PF, powdered PF, UF, MF). Further, polyurethane foam contains trace amounts of tin and silicon from catalysts and surfactants used for its manufacture. It is contemplated that these would be detectable in OSB containing ground polyurethane foam, and absent from prior-art OSB. Measurement of trace tin or silicon could be made more accurate by oxidizing the sample and testing only the ash, or by acid digestion of the sample. Further, ground polyurethane foam may be identified by its distinctive shape, which is visible with microscopy, for example as shown in FIG. 3.

Although larger particles may be used, and have been demonstrated to give satisfactory results, ground polyurethane foam particles most useful for the present invention have been ground finely enough that the large-scale cellular foam structure is generally destroyed. This creates several kinds of particles. Some are small irregular particles torn from the foam microstructure during grinding, but most particles show some evidence of the foam microstructure, even though the cells are generally not intact. For example, some particles are from the struts, or Plateau borders, that separate the cells in the foam. The physics of foam formation requires that these struts have a generally triangular cross section because they connect three foam films that rapidly equilibrate to be separated by 120° angles. Other particles come from the generally tetrahedral junctions where four struts meet. These are generally the larger particles, and they often show triangular cross sections where struts have been severed. Generally, smooth concave surfaces are an indicator for a particle of ground foam.

Figure 3:
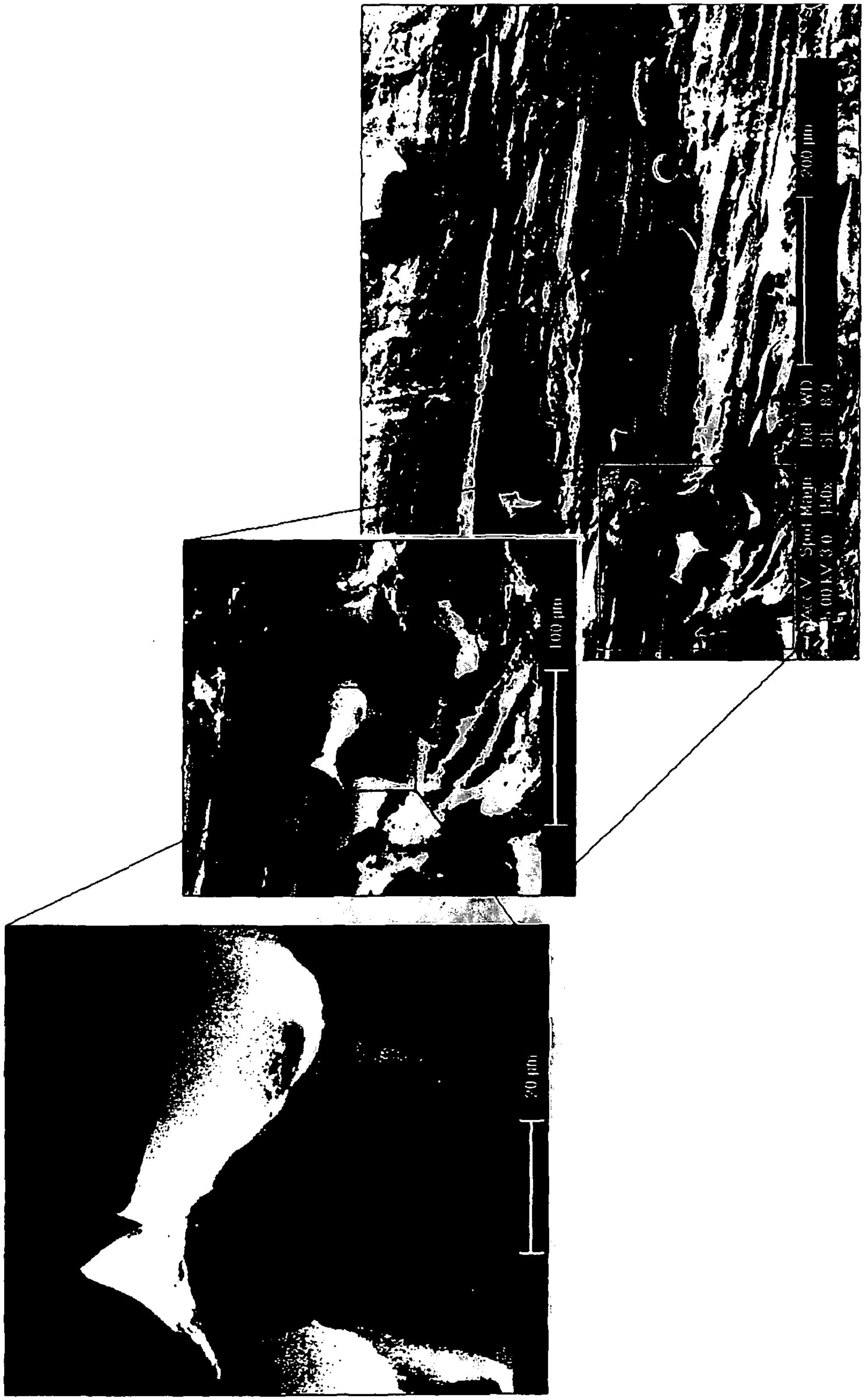
FIG. 3 shows a microscopic view at three magnifications of a fracture surface of an OSB sample that contains ground polyurethane foam. Some of the particles of ground polyurethane foam are easily identified by their shapes, which show remnants of foam struts with triangular cross-sections.

FIG. 3 shows the cellular structure of wood, with the grain running primarily horizontally on the photo. Also visible are several particles that are clearly remnants of a foam microstructure present on a fracture surface taken from an OSB board of Example 2. Also visible in this micrograph are a large irregular particle that is not identifiable as ground PUR foam, and a small spherical wax particle.

Figure 4:
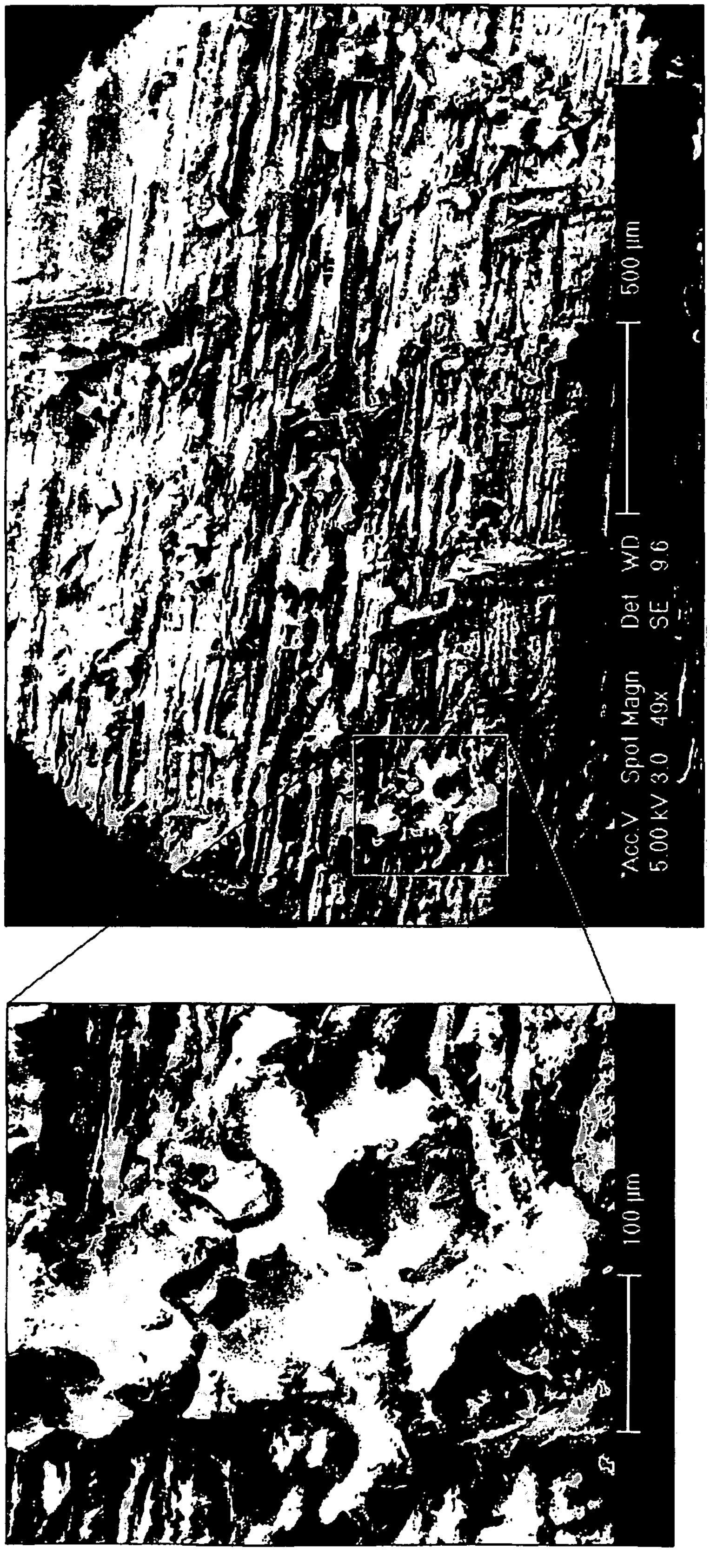
FIG. 4 shows a microscopic view at two magnifications of a different part of the same OSB sample as FIG. 3. Here, a wide view reveals many particles of ground polyurethane foam that have been compressed and partially deformed.

FIG. 4 also shows several particles that are remnants of a foam microstructure present on a fracture surface taken from an OSB board of Example 2. However, the particles in FIG. 4 have been deformed and flattened as they were compressed between wood strands. Even so, the triangular cross section of remnant struts is visible, and features radiate from those strut cross sections at the characteristic 120° angles. Also visible in FIG. 4 are several pieces of wood strands with their grain running vertically. These strands are bonded strongly to the underlying wood strands with grain running horizontally, because their presence indicates a cohesive failure of the wood when this sample was sectioned for microscopic examination.

The OSB board of Example 2 illustrates the following advantages of the invention. First, the process uses significantly reduced amounts pMDI, which is a hazardous and expensive chemical, and replaces it with polyurethane powder, which is nonhazardous and less expensive. Second, the composite material of this example comprises ground PUR foam, a waste product, thereby providing an environmental advantage by recycling a waste material. Further, the composite material comprises ground PUR foam, which is a polyurethane powder present as fine elastomeric particles. It is contemplated that these elastomeric particles act as crack arrestors and thereby increase the toughness and impact resistance of the composite material.

Inventors have found that the best results are obtained when press platen temperatures are elevated slightly, from the typical 200° C., to 210° C. to 200° C. Further, the type of polyurethane foam used to make ground PUR foam for the present invention is important. Although most types of PUR foam are suitable for use in the invention, best results may be achieved using polyurethane particles with a high amount of urethane functionality per unit mass. In this regard, inventors have found that rigid PUR foams are a preferred raw material for making ground PUR foam to replace binder in OSB applications. It is contemplated that the urethane groups cleave at temperatures of about 155° C. to 175° C., and that this creates active isocyanate groups that may function as a binder in OSB. Other functional groups in PUR foam, such as urea or isocyanurates, are stable until higher temperatures, and do not cleave significantly at OSB processing C temperatures. Therefore, PUR foams with higher urea content, such as lower-density, water-blown flexible PUR foams, or PUR foams, are not as preferable (although they may be used effectively) for the present invention as PUR foams with high urethane content, such as rigid PUR, for example from appliance or insulation recycling or manufacturing scrap.

Further, an embodiment of the invention is to use polyurethane particles throughout the thickness of OSB, it is most advantageous to replace binder with polyurethane particles in the face layers of OSB, rather than the core layer. This is because the temperature of the face layers is higher during OSB manufacture due to the proximity to the hot platens of the press. In the core layer, temperatures high enough to initiate cleavage of urethane functionality in polyurethane take longer to achieve and can slow the process down. However, using polyurethane particles to replace binder only in the face layer allows all of the advantages of the present invention, without increasing the pressing or cycle time for OSB manufacture. The inventors have demonstrated that it is possible to manufacture a wood-based composite board, for example wood particle board or plywood, in a press using only ground PUR foam as a binder, however the pressing time is several times longer than the prior-art process. Nevertheless, the inventors did demonstrate by that experiment that ground PUR foam, even as the only binder in a formulation, is capable of high performance as a binder for wood products.

Good results were obtained with ground rigid PUR foams and OSB boards meeting the required standards were produced at binder replacement levels up to 40%. OSB boards were also produced using ground rigid PUR foam to replace 60% of the original pMDI binder with good results. Ground PUR foam was used to replace even 100% of binder in composite wood boards with excellent physical properties, however with a pressing time several times longer than normal.

The inventors considered the wide spectrum of polyurethane foams produced today in terms of the percentage of the original isocyanate used in their manufacture that becomes urethane functionality in the final foam. That original isocyanate can become one of the following: urethane functionality, urea functionality, allophonate or biuret functionality, or isocyanurate functionality, depending upon the foam formulation and type of foam being made. Table 4 below shows approximate percentages of the original isocyanate in polyurethane foams that becomes these various functional groups.

TABLE 4

| | Approximate functional distribution of isocyanate in polyurethane foams | | |
|---|---|---|---|
| | Flexible PUR foam | Rigid PUR foam | Rigid PIR foam |
| Urethane | 15-20 | 50-60 | 20-25 |
| Urea | 70-80 | 20-25 | 15-20 |
| Allophanate, Biuret, and Carbodiimides | 5-10 | 5-10 | 0-5 |
| Isocyanurate | 0 | 0-10 | 60-70 |
| Approximate total amount available as NCO at OSB processing temperatures | 15-25 | 50-65 | 20-25 |

The approximate total amount of original isocyanate available at OSB processing temperatures, more specifically around 15° C. to 175° C., is at a minimum the amount present as urethane, and as a maximum the sum of the amounts present as urethane and allophanate and biuret functionality. The numbers in Table 4 are meant to be broad generalizations of a wide variety of polyurethane foams. There may be specific exceptions, but the inventors have found that it is preferable to maximize the amount of urethane functionality per unit mass in ground PUR foam to be used as a binder for wood products. The urethane functionality is the main mechanism for generation of free isocyanate groups at about 160° C. during OSB manufacture. Urea functionality does not depolymerize significantly at OSB processing temperatures, and instead will decompose at about 200° C. The stability of the allophanate functionality is poorly understood but likely unstable at lower temperatures, perhaps around 120° C. Biuret functionality and isocyanurate functionality are both stable to temperatures in excess of 200° C.

Lower molecular weight or higher functionality polyols also would contribute to higher urethane functionality per unit mass in ground PUR foam, because they would lower the mass of non-urethane material in PUR foam. Most rigid PUR foams also have this advantage over most flexible PUR foams.

Example 3

Strands of pine (*pinus sylvestris*) were made as described in Example 1.

The strands were resinated in a rotating drum according to the following procedure. First, the strands were placed in a blender drum, which was then closed and allowed to rotate for 5 minutes. First, water was sprayed on with an atomizer. Then, slack wax was sprayed on with an atomizer. Then, if present in the formulation, ground polyurethane foam was applied. Finally powdered phenolic resin (PPF) was added, for example as available from Dynea Canada or Hexion Specialty Chemicals, and the drum was rotated an additional 5 minutes. The amounts of PPF, water, and wax vary for the core layer composition and the surface layer composition as shown in Tables 5 and 6. The ground polyurethane foam for this example was rigid PUR foam obtained from insulation panel manufacturing scrap, where the foam had been crushed and briquetted for disposal before it was recovered and ground to a powder. A particle-size distribution of this ground polyurethane foam was determined using a Hosokawa Micron Air-let Sieve to be 26% passing 75 microns, 59% passing 105 microns, 73% passing 125 microns, 84% passing 150 microns, and 95% passing 212 microns.

TABLE 5

Production parameters for Example 3.

| | | unit | |
|---|---|---|---|
| | Board dimensions | mm | 864 × 864 × 11.1 |
| | Target density | kg/m$^3$ | 665 |
| | Hot platen temperature | ° C. | 215 |
| | Pressing time | s | 210-235 |
| | Weight ratio, core/surface | — | 45/55 |
| | Wax addition | % | 1 |
| | Moisture of strands before resination | % | 1.3 to 1.7 |
| Core layer | Moisture of strands after resination | % | 2.9-3.2 |
| | Total resin content (PPF only) | % | 2.5 |
| Surface layer | Moisture of strands after resination | % | 5.7-6.3 |
| | Total resin content (PPF + PUR) | % | 2.5 |

The resinated strands were then manually spread out into a mat with substantially all of the strands flat, but with their long dimensions randomly oriented within each layer in an 864×864 mm box. The mat was laid up as half of a known weight of surface layer composition, then a known weight of core layer composition, then the remaining half of a known weight of surface layer composition. A thermocouple was added in the center of the core layer in order to monitor temperature there during subsequent pressing. Just prior to pressing, 50 grams of water were sprayed onto the top surface of the mat.

The mat was then transferred to a heated steam press, with platens at 215° C., fixed top and bottom plates, and a sealed bottom screen, where it was compressed until the final desired thickness of 11.1 mm was reached. The press was held at the final thickness for the remainder of the pressing time before opening the press and removing the board for storage hot-stacked in an insulated box until cool.

Before testing, boards were conditioned for a minimum of 18 hours. Three separate boards were manufactured and tested for each example, and five samples were cut from each board for each physical test, for a total of 15 test samples for each example Physical properties of the boards were determined using standard methods described herein, and the results are shown below in Table 6.

The results of Example 3 show that the addition of ground PUR foam maintained or even improved physical properties, in particular internal-bond strength and performance in the 24-hour water soak test, while replacing expensive, energy-intensive, and potentially hazardous binder material (PPF) with a recycled product (PUR).

TABLE 6

Composition and physical properties from Examples 3

| | | unit | 3A | 3B | 3C |
|---|---|---|---|---|---|
| Surface layer | Moisture content | % | 5.7 | 5.9 | 6.3 |
| | Wax content | % | 1 | 1 | 1 |
| | Ground PUR foam substitution | % of resin | 0 | 40 | 50 |
| | Ground PUR foam content | % | 0 | 1.0 | 1.25 |
| | PPF content | % | 2.5 | 1.5 | 1.25 |
| | Total resin content (PPF + PUR) | % | 2.5 | 2.5 | 2.5 |
| Core layer | Moisture content | % | 3.2 | 2.9 | 2.9 |
| | Wax content | % | 1 | 1 | 1 |
| | Ground PUR foam substitution | % of resin | 0 | 0 | 0 |
| | Ground PUR foam content | % | 0 | 0 | 0 |
| | PPF content | % | 2.5 | 2.5 | 2.5 |
| | Total resin content (PPF + PUR) | % | 2.5 | 2.5 | 2.5 |
| | Density | kg/m$^3$ | 657 | 660 | 664 |
| | Internal bond strength | MPa | 0.52 | 0.55 | 0.57 |
| | 24-h water soak, thickness swell | % | 19.7 | 18.5 | 18.4 |
| | 24-h water soak, water absorption | % | 26.7 | 26.2 | 27.0 |
| | Modulus of rupture | MPa | 27 | 25 | 28 |
| | Modulus of elasticity | MPa | 3990 | 3960 | 4200 |

Powdered phenolic (PPF) resins, such as novolac, resole, or combinations thereof, may generally be used. U.S. Pat. No. 4,098,770 to Berchem, et al., discloses a typical spray-dried phenol-formaldehyde resin, modified with added non-phenolic polyhydroxy compounds, used in the manufacture of OSB. Liquid phenol-formaldehyde resins, such as resole or resole and novolac combinations, may also be generally used in the manufacture of lignocellulosic composites. Parameters for the manufacture of either liquid or solid phenol-formaldehyde resins are disclosed in Phenolic Resins, Chemistry, Applications and Performance, (A. Knop and L. A. Pilato, Springer-Verlag (1985)) and Advance Wood Adhesives Technology, (A Pizzi, Marcel Dekker (1994)).

Example 4

Strands of commercial aspen wood were made similarly as described for pine in Example 1, with additional screening to remove material passing through a 4.8-mm (3/16") screen.

The strands were resinated in a rotating drum according to the following procedure. The strands were placed in a blender drum, which was then closed and allowed to rotate for 5 minutes. First, water was sprayed on with an atomizer. Then, slack wax was sprayed on with an atomizer. Slack wax, such as Esso WAX 1834, is a soft, oily, crude wax obtained from the pressing of petroleum paraffin distillate or wax distillate. Preferred waxes are slack wax, powdered wax, or emulsified wax (an aqueous emulsion of a wax). Waxes suitable for the present invention are usually hydrocarbon mixtures derived from a petroleum refining process. They are utilized in order to impede the absorption of water, and thus make the product more dimensionally stable in a wet environment for some limited period of time. These hydrocarbon mixtures are insoluble in water. Hydrocarbon waxes obtained from petroleum are typically categorized on the basis of their oil content. "Slack wax", "scale wax", and "fully refined wax" have oil content values of 2 to 30%, 1 to 2% and 0 to 1%, respectively. Although high oil content is generally believed to have an adverse effect on the performance of a wax, slack wax is less expensive than the other petroleum wax types, and is thus used commonly in engineered panels. Alternatively, waxes suitable for the present invention can be any substance or mixture that is insoluble in water and has a melting point between about 35 and 160° C. It is also desirable for the wax to have low vapor pressure at temperatures between about 35 and 200° C.

Then, after the water and wax were applied, ground polyurethane foam was applied, if present in the formulation. Finally, commercially available OSB-grade powdered phenol formaldehyde resin (PPF) was added, for example as available from Dynea Canada or Hexion Specialty Chemicals as a product of a condensation reaction between phenol and formaldehyde in an alkaline environment, and the drum was rotated an additional 5 minutes. The amounts of PPF, water, and wax vary for the core layer composition and the surface layer composition as shown in Tables 7 and 8. The ground polyurethane foam for this example was rigid PUR foam obtained from recycled refrigerators, where the foam had been separated from the other materials and finely ground, fully destroying the cellular structure, with recovery of chlorofluorocarbon blowing agents. A particle-size distribution of this ground polyurethane foam was determined using a Hosokawa Micron Air-Jet Sieve to be 14% passing 53 microns, 48% passing 75 microns, 87% passing 105 microns, 99% passing 150 microns, and essentially 100% passing 212 microns.

TABLE 7

Production parameters for Example 4.

| | | Unit | |
|---|---|---|---|
| | Board dimensions | mm | 711 × 711 × 18.0 |
| | Target density | $kg/m^3$ | 561 |
| | Hot platen temperature | ° C. | 220 |
| | Pressing time | s | 448 |
| | Weight ratio, core/surface | — | 45/55 |
| | Wax addition | % | 1 |
| Core layer | Moisture of strands after resination | % | 2.0-2.1 |
| | Total resin content (PPF only) | % | 3.0 |
| Surface layer | Moisture of strands after resination | % | 4.6-5.2 |
| | Total resin content (PPF + PUR) | % | 3.0 |

The resinated strands were then spread out into a mat with substantially all of the strands flat, but with their long dimensions randomly oriented within each layer in an 864×864 mm box. The mat was laid up as half of a known weight of surface layer composition, then a known weight of core layer composition, then the remaining half of a known weight of surface layer composition. A thermocouple was added in the center of the core layer in order to monitor temperature there during subsequent pressing.

The mat was then transferred to a heated steam press, with platens at 220° C., fixed top and bottom plates, and a sealed bottom screen, where it was compressed until the final desired thickness of 18.0 mm was reached in approximately 30 to 60 seconds. The press was held at the final thickness for the remainder of the 3 to 10 minutes of pressing time before opening the press and removing the board for storage hot-stacked in an insulated box until cool.

Before testing, boards were conditioned at 25° C. and 50% relative humidity for a minimum of 18 hours. Three separate boards were manufactured and tested for each example, and five samples were cut from each board for each physical test, for a total of 15 test samples for each example. Physical properties of the boards were determined using standard methods described in Canadian Standards Association O437 Series-93, Standards on OSB and Waferboard, summarized herein, and the results are shown below in Table 8.

Internal bond strength (IB) is measured by bonding loading blocks (50×50 mm) of steel or aluminum alloy to each face of each test specimen in such a way that the strength of the glue line is substantially stronger than the strength of the material being tested. The specimen is then loaded in a standard testing machine by separation of the loading fixtures at a uniform rate of 0.08 mm per mm of sample thickness per minute, while maintaining the specimen perpendicular to the direction of loading. The internal bond strength is calculated as the maximum load divided by the area of the specimen.

Thickness swell is measured as the percent gain in thickness of 150 mm square samples after submerging horizontally under 25 mm of 20° C. water for 24 hours, followed by 10 minutes of suspension for draining. Water absorption is measured as the percent gain in weight for similar samples under the same conditions.

Modulus of rupture (MOR) and modulus of elasticity (MOE) are measured by flexurally loading a 75-mm wide sample on a testing machine in a three-point bend arrangement. The sample may be cut with its length parallel or perpendicular to the direction of orientation in the board. The sample is made to span 24 times its thickness, plus 25 mm of overhang on each end. The sample is loaded at midspan such that it deflects at a rate of 0.48 mm per minute per mm of sample thickness. The load is measured versus deflection, and the MOR is calculated as 1.5 times the maximum load times the span length divided by the sample width divided by the square of the sample thickness. The MOE is calculated as 0.25 times the slope of the initial linear part of the load-deflection curve times the cube of span length divided by the sample width divided by the cube of the sample thickness.

The results of Example 4 show that the addition of ground PUR foam maintained or unexpected even improved physical properties, in particular internal-bond strength and performance in the 24-hour water soak test, while replacing expensive, energy-intensive, and potentially hazardous binder material (PPF) with a recycled product (PUR).

TABLE 8

Composition and physical properties from Examples 4

| | | Unit | 4A | 4B | 4C |
|---|---|---|---|---|---|
| Surface layer | Moisture content | % | 5.2 | 5.1 | 4.6 |
| | Wax content | % | 1 | 1 | 1 |
| | Ground PUR foam substitution | % of resin | 0 | 20 | 40 |
| | Ground PUR foam content | % | 0 | 0.6 | 1.2 |
| | PPF content | % | 3.0 | 2.4 | 1.8 |
| | Total resin content (PPF + PUR) | % | 3.0 | 3.0 | 3.0 |
| Core layer | Moisture content | % | 2.1 | 2.0 | 2.0 |
| | Wax content | % | 1 | 1 | 1 |
| | Ground PUR foam substitution | % of resin | 0 | 0 | 0 |
| | Ground PUR foam content | % | 0 | 0 | 0 |
| | PPF content | % | 3.0 | 3.0 | 3.0 |
| | Total resin content (PPF + PUR) | % | 3.0 | 3.0 | 3.0 |
| | Density | $kg/m^3$ | 561 | 566 | 561 |
| | Internal bond strength | MPa | 0.23 | 0.33 | 0.35 |
| | 24-h water soak, thickness swell | % | 9.9 | 9.6 | 10.6 |
| | 24-h water soak, water absorption | % | 27.8 | 25.2 | 25.8 |
| | Modulus of rupture | MPa | 21 | 20 | 19 |
| | Modulus of elasticity | MPa | 4160 | 4160 | 3960 |

The ground polyurethane foam for this example was rigid PUR foam obtained from recycled refrigerators, where the foam had been separated from the other materials and finely ground, fully destroying the cellular structure, with recovery of chlorofluorocarbon blowing agents. A particle-size distribution of this ground polyurethane foam was determined using a Hosokawa Micron Air-Jet Sieve to be 14% passing 53 microns, 48% passing 75 microns, 87% passing 105 microns, 99% passing 150 microns, and essentially 100% passing 212 microns.

The resinated strands were continuously formed into a mat with substantially all of the strands flat, but with their long dimensions randomly oriented within each layer on a moving steel belt conveyor. The mat was laid up as the bottom surface layer composition (21% of the total throughput), then the core layer composition (58% of the total throughput), then the top surface layer composition (the remaining 21% of the total throughput). The total mass throughput was chosen such that the resulting panel would be 22 mm thick, with a density of 620 $kg/m^3$, with a heating factor of 6.7 s/mm in a 34-m long continuous press. The temperature of the oil circulating to heat the continuous press was 230° C. in the feed zone, ramping up to 240° C. and down to 220° C. then 205° C. as the mat progressed through the continuous press.

The boards exited the press, then were cut, cooled, and conditioned for testing. Physical properties of the boards were determined using standard methods described herein, and the results are shown below in Table 9. Internal bond strength (2-hour boil) was determined according to European Standard EN 1087-1, which in summary is the internal bond test described above, with the samples first conditioned by immersion in a water bath that is then heated over 90 minutes from 20° C. to 100° C., then held at 100° C. for 120 minutes then removed and cooled in a second water bath at 20° C. for 1 to 2 hours. The samples are then tested wet.

The results of Example 5 show that the addition of ground PUR foam maintained or unexpectedly even improved physical properties, in particular stiffness and strength, while replacing expensive, energy-intensive, and potentially hazardous binder material (PMDI) with a recycled product (PUR).

Example 5

Full-Scale Continuous Production

Standard strands of spruce (*picea abeis*) wood with a thickness of 0.7 mm were prepared at a commercial OSB manufacturing facility.

The strands were resinated in two continuous coil blenders, one for the face layer formulation, and one for the core layer formulation. For the core layer, the strands were blended with water (to achieve 4% moisture content), 1.4% of a water-repellent wax as described in Example 3, and 4.3% of Huntsman Suprasec 1483 polymeric diphenyl methane diisocyanate, which is a standard-functionality, catalyzed fast-cure pMDI with a viscosity of 225 mPa-s at 25° C. and an isocyanate (NCO) value of 30.8%. For the face layer, the strands were blended first with ground polyurethane foam, then this mixture was blended with water (to achieve 10.5% moisture content), 1.4% of a water-repellent wax, and Huntsman Suprasec 1483 pMDI. The amounts of pMDI and ground polyurethane foam in the face layer formulation were selected so that there was a 67:33 ratio of pMDI to ground polyurethane foams and so that the sum of pMDI and ground polyurethane foam was equal to 5.0% of the strand weight. Because this was a continuous process, the ratios apply to mass flow rates.

TABLE 9

Composition and physical properties from Examples 5

| | | Unit | 5A | 5B |
|---|---|---|---|---|
| Surface layer | Moisture content | % | 10.5 | 10.5 |
| | Wax content | % | 1.4 | 1.4 |
| | Ground PUR foam substitution | % of resin | 0 | 33 |
| | Ground PUR foam content | % | 0 | 1.66 |
| | pMDI content | % | 5 | 3.5 |
| | Total resin content (pMDI + PUR) | % | 5 | 5.16 |
| Core layer | Moisture content | % | 4 | 4 |
| | Wax content | % | 1.4 | 1.4 |
| | Ground PUR foam substitution | % of resin | 0 | 0 |
| | Ground PUR foam content | % | 0 | 0 |
| | pMDI content | % | 4.3 | 4.3 |
| | Total resin content (pMDI + PUR) | % | 4.3 | 4.3 |
| | Density | $kg/m^3$ | 620 | 620 |
| | Internal bond strength (dry) | MPa | 0.40 | 0.37 |
| | Internal bond strength (2-h boil) | MPa | 0.08 | 0.10 |
| | Modulus of rupture (parallel) | MPa | 33 | 31 |
| | Modulus of elasticity (parallel) | MPa | 5270 | 5450 |
| | Modulus of rupture (perpendicular) | MPa | 20 | 19 |
| | Modulus of elasticity (perpendicular) | MPa | 3030 | 2930 |

Example 6

Full-Scale Continuous Production

Standard strands of spruce (*picea abeis*) wood with a thickness of 0.7 mm were prepared at a commercial OSB manufacturing facility.

The strands were resinated in two continuous coil blenders one for the face layer formulation, and one for the core layer formulation. For the core layer, the strands were blended with water (to achieve 5% moisture content), 2% of a water-repellent wax. 0.49% of urea hardener, and 8.5% of Huntsman Suprasec 1483 pMDI. For the face layer, the strands were blended first with ground polyurethane foam, and then this mixture was blended with water (to achieve 13% moisture content), 2% of a water-repellent wax, 0.49% of a urea hardener, and Huntsman Suprasec 1483 pMDI. The amounts of pMDI and ground polyurethane foam in the face layer formulation were selected so that there was a 70:30 ratio of pMDI to ground polyurethane foam, and so that the sum of pMDI and ground polyurethane foam was equal to 8.5% of the strand weight. Because this was a continuous process, the ratios apply to mass flow rates. For example, for the face layers (36% of the total machine throughput) in this example 6B, the flow rate of ground polyurethane foam was about 4.7 kg/min, and the corresponding flow rate of pMDI was about 11.0 kg/min, and the throughput of wood strands was about 185 kg/min.

The ground polyurethane foam for this example was rigid PUR foam obtained from recycled refrigerators, where the foam had been separated from the other materials and finely ground, fully destroying the cellular structure, with recovery of chlorofluorocarbon blowing agents. A particle-size distribution of this ground polyurethane foam was determined using a Hosokawa Micron Air-Jet Sieve to be 14% passing 53 microns, 48% passing 75 microns, 87% passing 105 microns, 99% passing 150 microns, and essentially 100% passing 212 microns.

The resinated strands were continuously formed into a mat with substantially all of the strands flat, but with their long dimensions randomly oriented within each layer on a moving steel belt conveyor. The mat was laid up as the bottom surface layer composition (18% of the total throughput), then the core layer composition (64% of the total throughput), then the top surface layer composition (the remaining 18% of the total throughput). The total mass throughput was chosen such that the resulting panel would be 15 mm thick, with a density of 660 $kg/m^3$, with a heating factor of 9 s/mm in a 45-m long continuous press. The temperature of the oil circulating to heat the continuous press was 245° C. in the feed zone, ramping down to 240° C. in subsequent zone 2, and 230° C. in zone 3.

The boards exited the press, then were cut, cooled, and conditioned for testing. Physical properties of the boards were determined using standard methods described herein, and the results are shown below in Table 10.

The results of Example 6 show that the addition of ground PUR foam maintained or even improved physical properties, in particular stiffness and strength, while replacing expensive, energy-intensive, and potentially hazardous binder material (PMDI) with a recycled product (PUR).

TABLE 10

Composition and physical properties from Examples 6

| | | Unit | 6A | 6B |
|---|---|---|---|---|
| Surface layer | Moisture content | % | 13 | 13 |
| | Wax content | % | 2 | 2 |
| | Hardener content | % | 0.49 | 0.49 |
| | Ground PUR foam substitution | % of resin | 0 | 30 |
| | Ground PUR foam content | % | 0 | 2.5 |
| | pMDI content | % | 8.5 | 6.0 |
| | Total resin content (pMDI + PUR) | % | 8.5 | 8.5 |
| Core layer | Moisture content | % | 5 | 5 |
| | Wax content | % | 1 | 1 |
| | Hardener content | % | 0.49 | 0.49 |
| | Ground PUR foam substitution | % of resin | 0 | 0 |
| | Ground PUR foam content | % | 0 | 0 |
| | pMDI content | % | 8.5 | 8.5 |
| | Total resin content (pMDI + PUR) | % | 8.5 | 8.5 |
| | Density | $kg/m^3$ | 660 | 660 |
| | Modulus of rupture (parallel) | MPa | 39 | 43 |
| | Modulus of elasticity (parallel) | MPa | 6170 | 6590 |
| | Modulus of rupture (perpendicular) | MPa | 22 | 26 |
| | Modulus of elasticity (perpendicular) | MPa | 3080 | 3450 |

Example 7

Full-Scale Continuous Production

Standard strands of pine (*pinus sylvestris*) wood with a thickness of 0.7 mm were prepared at a commercial OSB manufacturing facility.

The strands were resinated in two continuous coil blenders as are known commercially in the art, one for the face layer formulation, and one for the core layer formulation. For the core layer, the strands were blended with water (to achieve 6% moisture content), 3% of a water-repellent wax, 0.49% of a urea hardener, and 8.5% of Huntsman Suprasec 1483 pMDI. For the face layer, the strands were blended first with ground polyurethane foam, and then this mixture was blended with water (to achieve 12% moisture content), 3% of a water-repellent wax, 0.49% of a urea hardener, and Huntsman Suprasec 1483 pMDI. The amounts of pMDI and ground polyurethane foam in the face layer formulation were selected so that there was a 60:40 ratio of pMDI to ground polyurethane foam, and so that the sum of pMDI and ground polyurethane foam was equal to 8.5% of the strand weight. Because this was a continuous process, the ratios apply to mass flow rates. For example, for the face layers (40% of the total machine throughput) in this example 7B, the flow rate of ground polyurethane foam was about 6.1 kg/min, and the corresponding flow rate of pMDI was about 9.2 kg/min, and the throughput of wood strands was about 180 kg/min.

The ground polyurethane foam for this example was rigid PUR foam obtained from recycled refrigerators, where the foam had been separated from the other materials and finely ground, fully destroying the cellular structure, with recovery of chlorofluorocarbon blowing agents. A particle-size distribution of this ground polyurethane foam was determined using a Hosokawa Micron Air-Jet Sieve to be 14% passing 53 microns, 48% passing 75 microns, 87% passing 105 microns, 99% passing 150 microns, and essentially 100% passing 212 microns.

The resinated strands were continuously formed into a mat with substantially all of the strands flat, but with their long dimensions randomly oriented within each layer on a moving steel belt conveyor. The mat was laid up as the bottom surface layer composition (20% of the total throughput), then the core layer composition (60% of the total throughput), then the top surface layer composition (the remaining 20% of the total throughput). The total mass throughput was chosen such that the resulting panel would be 15 mm thick, with a density of 660 kg/m$^3$, with a heating factor of 9.6 s/mm in a 45-m long continuous press. The temperature of the oil circulating to heat the continuous press was 245° C. in the feed zone, ramping down to 240° C. and 230° C. as the mat progressed through the press.

The boards exited the press, then were cut, cooled, and conditioned for testing. Physical properties of the boards were determined using standard methods described herein, and the results are shown below in Table 11.

The results of Example 7 show that the addition of ground PUR foam maintained or even improved physical properties, in particular stiffness and strength, while replacing expensive, energy-intensive, and potentially hazardous binder material (PMDI) with a recycled product (PUR).

TABLE 11

Composition and physical properties from Examples 7

| | | Unit | 7A | 7B |
|---|---|---|---|---|
| Surface layer | Moisture content | % | 12 | 12 |
| | Wax content | % | 3 | 3 |
| | Hardener content | % | 10 | 10 |
| | Ground PUR foam substitution | % of resin | 0 | 40 |
| | Ground PUR foam content | % | 0 | 3.4 |
| | pMDI content | % | 8.5 | 5.1 |
| | Total resin content (pMDI + PUR) | % | 8.5 | 8.5 |
| Core layer | Moisture content | % | 6 | 6 |
| | Wax content | % | 3 | 3 |
| | Hardener content | % | 10 | 10 |
| | Ground PUR foam substitution | % of resin | 0 | 0 |
| | Ground PUR foam content | % | 0 | 0 |
| | pMDI content | % | 8.5 | 8.5 |
| | Total resin content (pMDI + PUR) | % | 8.5 | 8.5 |
| | Density | kg/m$^3$ | 660 | 660 |
| | Internal bond strength (dry) | MPa | 0.81 | 0.85 |
| | Modulus of rupture (parallel) | MPa | 36 | 36 |
| | Modulus of elasticity (parallel) | MPa | 5940 | 5980 |

TABLE 11-continued

Composition and physical properties from Examples 7

| | Unit | 7A | 7B |
|---|---|---|---|
| Modulus of rupture (perpendicular) | MPa | 26 | 26 |
| Modulus of elasticity (perpendicular) | MPa | 3430 | 3420 |
| Thickness swell | % | 8.1 | 8.8 |

Example 8

Boards were made exactly as in Example 2, except that several different types of polyurethane powder were used to replace 40% of pMDI. These included A) finely ground (200-micron maximum size) scrap semi-rigid thermoformable polyurethane foam from automotive headliner manufacture; B) finely ground (200-micron maximum size) scrap from conventional flexible polyurethane foam manufacture: C) coarsely ground (590 micron maximum size) viscoelastic polyurethane foam ("memory foam") manufacturing scrap; D) coarsely ground (1200 micron maximum size) viscoelastic polyurethane foam manufacturing scrap; E) finely ground (200-micron maximum size) scrap from high-resilience flexible polyurethane foam manufacture; and F) finely ground (200-micron maximum size) scrap foam from recycled automotive seats. All of the polyurethane powders made satisfactory boards that met manufacturer's specifications for density, internal bond strength (dry and after two-hour boil), modulus of rupture, modulus of elasticity, thickness swell, edge swell, and water absorption.

This application discloses several numerical range limitations that support any range within the disclosed numerical ranges even though a precise range limitation is not stated verbatim in the specification because the embodiments of the invention could be practiced throughout the disclosed numerical ranges. Finally, the entire disclosure of the patents and publications referred in this application, if any, are hereby incorporated herein in entirety by reference.

The invention claimed is:

1. A process for manufacturing a composite material comprising:

a surface layer comprising a solid reinforcing material and solid polyurethane particles;

a core layer comprising the solid reinforcing material and a binder resin;

wherein the solid polyurethane particles and the binder resin have different compositions; and wherein the solid reinforcing material comprises wood, the method comprising depositing the core layer and depositing the surface layer, wherein the surface layer and the core layer are separately applied to form separate layers having different compositions, further comprising spraying the binder resin on the solid reinforcing material.

2. A process for manufacturing a composite material comprising:

a surface layer comprising a solid reinforcing material and solid polyurethane particles;

a core layer comprising the solid reinforcing material and a binder resin;

wherein the solid polyurethane particles and the binder resin have different compositions; and wherein the solid reinforcing material comprises wood, the method comprising depositing the core layer and depositing the surface layer, wherein the surface layer and the core layer are separately applied to form separate layers having different compositions, wherein the depositing the core layer comprises spreading a mixture comprising the solid reinforcing material and the binder resin.

3. A process for manufacturing a composite material comprising:

a surface layer comprising a solid reinforcing material and solid polyurethane particles;

a core layer comprising the solid reinforcing material and a binder resin;

wherein the solid polyurethane particles and the binder resin have different compositions; and wherein the solid reinforcing material comprises wood, the method comprising depositing the core layer and depositing the surface layer, wherein the surface layer and the core layer are separately applied to form separate layers having different compositions, wherein the depositing the surface layer comprises spreading a mixture comprising the solid reinforcing material and the solid polyurethane particles.

4. The process of claim 2, wherein the weight percent of the solid polyurethane particles in a matrix comprising the binder resin and the solid polyurethane particles is 5 to 95 weight percent of the matrix.

5. The process of claim 2, wherein the weight percent of the solid polyurethane particles in a matrix comprising the binder resin and the solid polyurethane particles is 30 to 60 weight percent of the matrix.

6. The process of claim 2, wherein a matrix comprising the binder resin and the solid polyurethane particles is in a form of a continuous phase or a discontinuous phase.

7. The process of claim 2, wherein the solid reinforcing material is oriented in a plane of the composite material.

8. The process of claim 2, further comprising treating the core layer and the surface layer under heat and pressure in a press, a mold or an autoclave to form the composite material.

9. The process of claim 2, wherein the wood is in a form selected from the group consisting of sheets, plies, wafers, strands, chips, particles, dust and combinations thereof.

10. The process of claim 2, wherein the solid reinforcing material further comprises fibers.

11. The process of claim 10, wherein the fibers are selected from the group consisting of carbon fibers, glass fibers, aramid fibers, cellulose fibers and combinations thereof.

12. The process of claim 2, wherein the binder is selected from the group consisting of polymeric MDI, phenol formaldehyde, urea formaldehyde, melamine formaldehyde and combinations thereof.

13. The process of claim 2, wherein the wood is in a form selected from the group consisting of sheets, plies, wafers, strands, chips, particles, dust and combinations thereof, and wherein the solid polyurethane particles comprise particles of ground rigid polyurethane foam.

14. The process of claim 2, wherein the composite material is an oriented strand board.

15. The process of claim 2, wherein the core layer contains no solid polyurethane particles.

16. The process of claim 2, wherein at least 50 weight percent of the composite material comprises wood.

17. The process of claim 3, wherein at least 50 weight percent of the composite material comprises wood.

18. The process of claim 2, wherein the surface layer and the core layer are continuously formed.

19. The process of claim 3, wherein the surface layer and the core layer are continuously formed.

* * * * *